United States Patent [19]

Mittler et al.

[11] Patent Number: 4,876,627

[45] Date of Patent: Oct. 24, 1989

[54] VARIABLE ELECTRONIC COMPONENT

[75] Inventors: Martin A. Mittler, Lake Hiawatha; Kenneth J. Scowen, Springfield, both of N.J.

[73] Assignee: Voltronics Corporation, East Hanover, N.J.

[21] Appl. No.: 334,911

[22] Filed: Apr. 6, 1989

[51] Int. Cl.[4] .............................................. H01G 5/06
[52] U.S. Cl. ................................................... 361/293
[58] Field of Search ......................... 361/292, 293, 287

[56] References Cited

U.S. PATENT DOCUMENTS

| | | | |
|---|---|---|---|
| 3,679,940 | 7/1972 | Newman et al. | 317/101 C |
| 3,701,932 | 10/1972 | Johanson | 361/293 |
| 3,757,266 | 9/1973 | Newman et al. | 338/158 |
| 4,181,923 | 1/1980 | Tatsumi et al. | 361/293 |
| 4,242,716 | 12/1980 | Johanson et al. | 361/293 |
| 4,575,779 | 3/1986 | Mittler et al. | 361/296 |

*Primary Examiner*—Donald A. Griffin
*Attorney, Agent, or Firm*—Lerner, David, Littenberg, Krumholz & Mentlik

[57] ABSTRACT

A variable electronic component in the nature of a capacitor includes a free floating impedance varying member disposed overlying an impedance varying portion of a rotor. The impedance varying portion includes a substantially planar surface and an adjacent opening which are brought into varying degrees of overlying registration with the impedance varying member.

28 Claims, 3 Drawing Sheets

VARIABLE ELECTRONIC COMPONENT

BACKGROUND OF THE INVENTION

The present invention relates in general to a variable electronic component, and more particularly, to a sealed, variable trimmer capacitor adapted to provide a high resolution operative range of impedance characteristics employing a free-floating dielectric plate.

In the advancing technologies of computers, testing equipment, appliances and other fields, various types of hybrid electronic circuits, integrated electronic circuits, micro strip amplifiers, micro electronic systems and other electronic devices are being developed and which are being made on increasingly smaller scale and size than has been known heretofore. In accomplishing this end, these devices are generally mounted on small flat insulating bases known as substrates. These various devices incorporate or have formed therein or co-act with various types of electronic components such as inductors, capacitors, resistors, potentiometers, etc., which in turn must be as small as possible to meet the demands of the reduced scale or size of these devices.

The known miniature devices have reached their functional limit even with the best precision manufacturing techniques because certain elements of these devices cannot be reduced further at reasonable cost for commercially acceptable regularly usable devices. U.S. Pat. Nos. 3,679,940 and 3,757,266, which patents are assigned to the same assignee of the within invention, each disclose variable electronic components, such as capacitors and resistors, which are particularly adapted to meet and overcome the problems of these known devices by eliminating the area and mass of conventional mounting frames, tuning mechanisms and other elements heretofore used, and instead integrate the elements of these variable electronic components directly into the circuit. These components are primarily designed as low-profile structures exceedingly small in size, simple in construction, easily adjustable, reliable in operation, easily replaceable and reproducible in quantity without sacrificing uniformity or performance. However, these variable electronic components are not sealed within a housing, thus subjecting their elements to processing fluids used during the manufacture of the electronic circuits into which they are incorporated. Another variable capacitor of the very low resolution type, i.e., ½ turn resolution, and which is also unsealed is known from U.S. Pat. No. 3,701,932.

Owing to the exceedingly small size of these variable electronic components, the ability to provide a high resolution device and to readily adjust these components have likewise become exceedingly more difficult. These low resolution devices have been provided with an upturned tab to be engaged by a suitable adjustable tool, for example, a tweezer, so as to effect the desired operative range of impedance characteristics of the component. As these components become increasingly smaller in size, it can be appreciated that there is a need to provide a more accurate and reliable means of providing the requisite adjustment, as well as improving their resolution. There has been known to include in these variable electronic components a rack and pinion assembly operable upon rotation by a miniature screw driver in order to facilitate their adjustment.

One variable electronic component which satisfies the aforementioned objective is known from U.S. Pat. No. 4,575,779, which patent is assigned to the same assignee of the within invention. This known variable electronic component is constructed specifically as a low resolution device to include an eccentric whose rotational motion imparts reciprocal movement to an impedance-bearing member. The eccentric is operative by engagement with an implement such as a screw driver and the like. However, the elements of this variable electronic component are not contained within a sealed housing, and are therefore exposed to the environment which can effect the component's impedance characteristics due to corrosion and other such action over time.

Accordingly, it can be appreciated that there is an unsolved need for a sealed variable electronic component, such as a variable trimmer capacitor, which can provide a desired high resolution operative range of impedance characteristics quickly, simply and inexpensively by adjustment using a suitable implement such as a screw driver and the like.

SUMMARY OF THE INVENTION

It is broadly an object of the present invention to provide a variable electronic component which overcomes or avoids one or more of the foregoing disadvantages resulting from the above-mentioned known variable electronic components, and which fulfills the specific requirements of such a variable electronic component for use in subminiature electronic circuits such as those disposed on a supporting substrate. Specifically, one aspect of the present invention provides a variable electronic component which includes sealed elements which facilitates the adjustment of the component to provide a desired high resolution operative range of impedance characteristics.

Another object of the present invention is to provide a variable electronic component which is relatively small and cheap to build, and wherein the area and mass of conventional mounting means of known devices are substantially eliminated.

Another object of the present invention is to provide a variable electronic component particularly adapted for use in high-frequency subminiature electronic systems and devices.

Another objection of the present invention is to provide a variable electronic component which is relatively easy to adjust to provide fine high resolution tuning for the electronic circuit for which it will be used.

Another object of the present invention is to provide a variable electronic component which is provided within a sealed housing to protect the components from moisture, liquids and other contaminants and processing fluids.

Another object of the present invention is to provide a variable electronic component that is readily adaptable for surface mounting on printed circuit boards.

Another object of the present invention is to provide a variable electronic component that maintains precision capacitance during shock and vibration of the electronic equipment into which it is installed.

Another object of the present invention is to provide a variable electronic component that has a high capacitance range for the size of the housing.

In accordance with one embodiment of the present invention, there is provided a variable electronic component constructed of a housing, a rotor within the housing, the rotor having a contact portion and an impedance varying portion, rotating means for rotating the rotor, an impedance varying member arranged overlying a portion of the impedance varying portion, first contact means engaging the contact portion, of the rotor without engaging the impedance varying member and second contact means urging said impedance varying member into sliding contact with a portion of the impedance varying portion, whereby rotation of the rotor varies the extent of overlap between the impedance varying member and the impedance varying portion to provide a desired range of impedance characteristics to the component.

In accordance with another embodiment of the present invention, there is provided a variable electronic component constructed of a housing, a rotor constructed of a cylindrical member having a peripheral region arranged within the housing, the rotor having a contact portion and an impedance varying portion, rotating mean engaging the peripheral region of the rotor for rotating the rotor within the housing, an impedance varying member arranged overlying a portion of the impedance varying portion, first contact means coupled to the contact portion, and second contact means urging the impedance varying member into sliding contact with a portion of the impedance varying portion, whereby rotation of the rotor varies the extent of overlap between the impedance varying member and the impedance varying portion to provide a desired range of impedance characteristics to the component.

BRIEF DESCRIPTION OF THE DRAWINGS

The above description, as well as further objects, features and advantages of the present invention will be more fully understood with reference to the following detailed description of a presently preferred, but nonetheless illustrative, variable electronic component, when taken in conjunction with the accompanying drawings, wherein.

DETAILED DESCRIPTION

Figure 1:
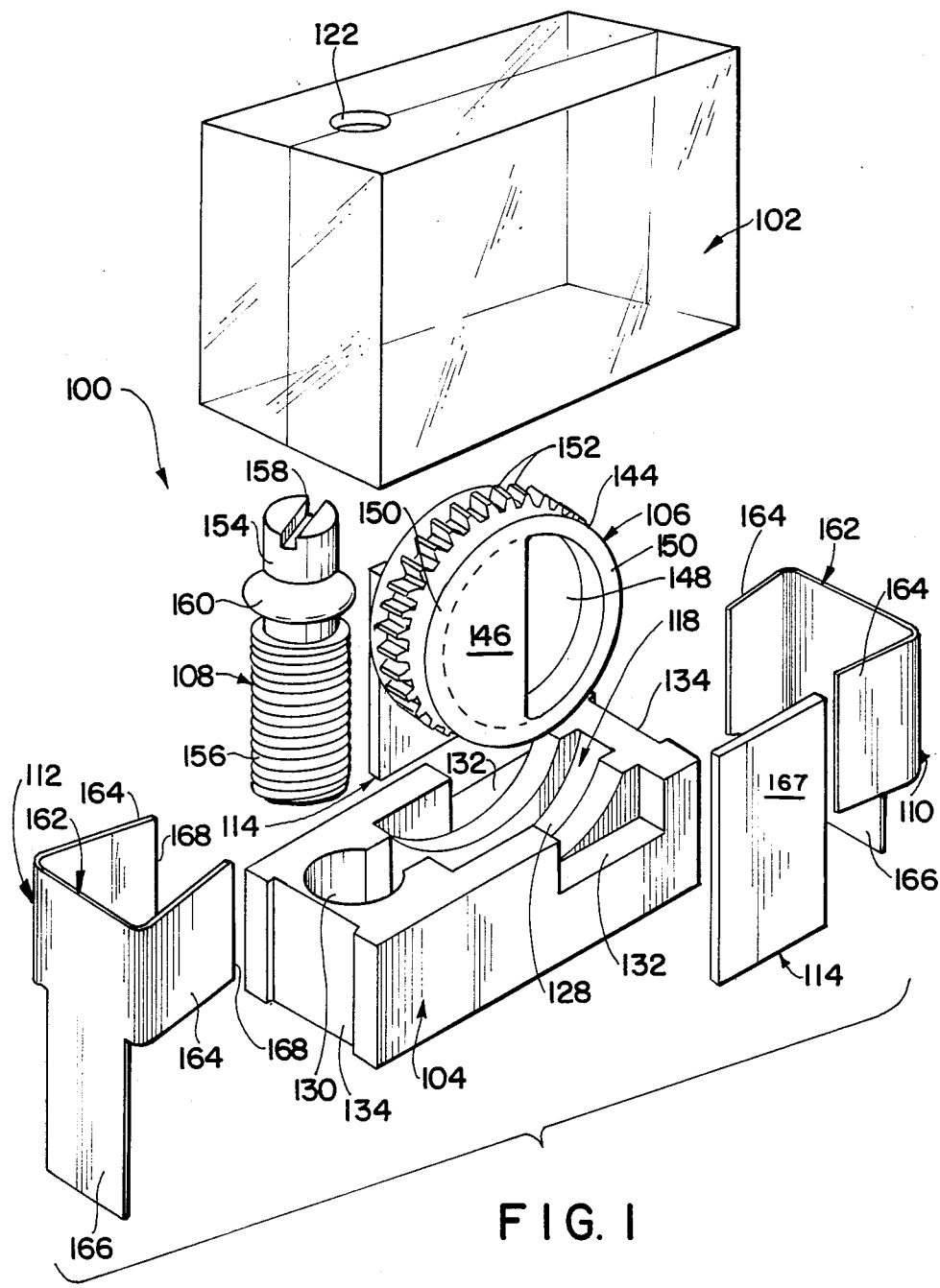
FIG. 1 is an enlarged exploded perspective view of a variable trimmer capacitor constructed in accordance with the present invention and showing the individual components thereof.

Referring to the drawings, wherein like reference numbers represent like elements, there is shown in FIG. 1 a variable electronic component in the nature of a variable trimmer capacitor generally designated by reference numeral 100, and constructed in accordance with the present invention. The trimmer capacitor 100 is constructed of a housing 102, a housing base 104, a rotor 106, a worm gear 108, a stator terminal 110, a rotor terminal 112 and a pair of dielectric plates 114.

Figure 3:
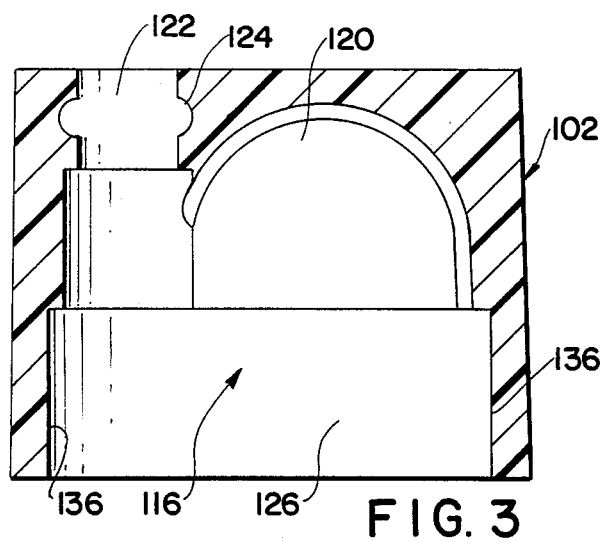
FIG. 3 is a cross-sectional view of the housing for the variable trimmer capacitor constructed in accordance with the present invention.
Figure 4:
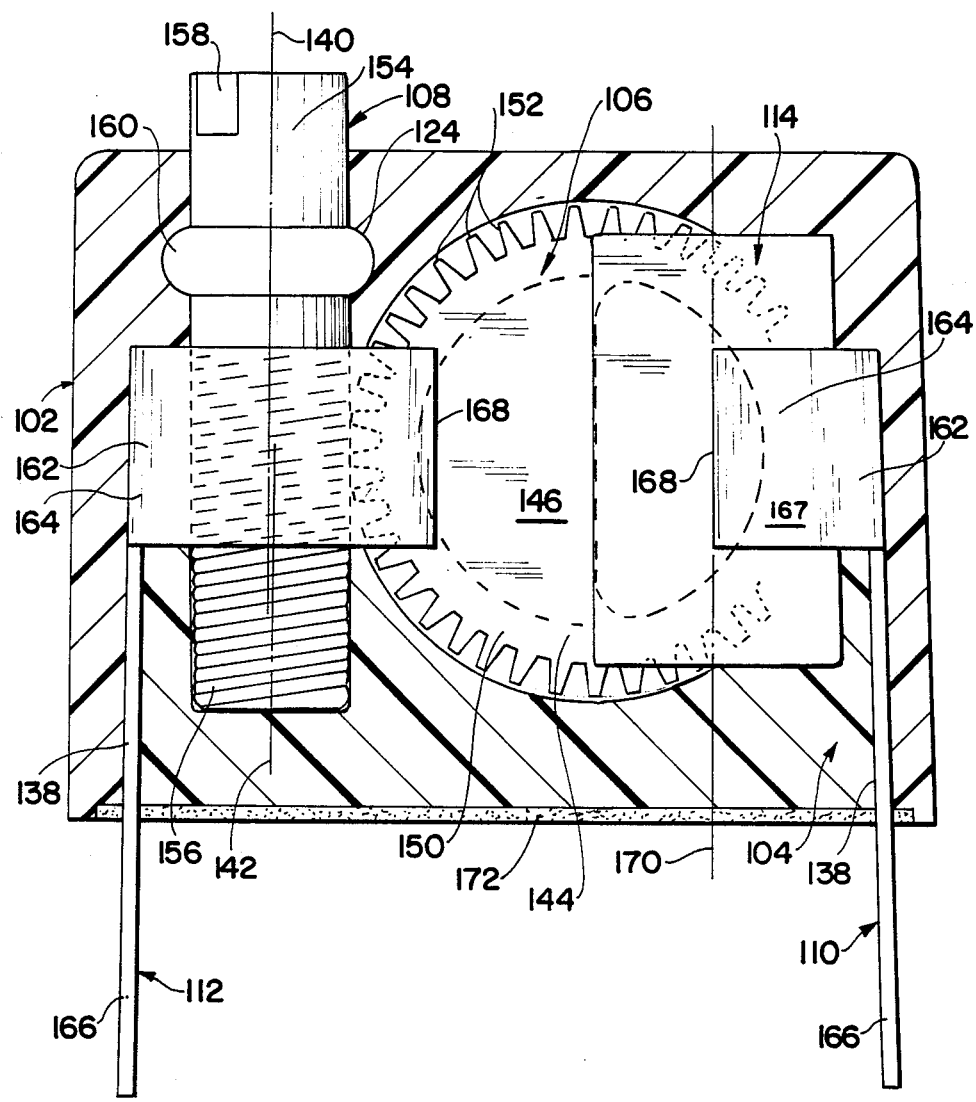
FIG. 4 is a partial cross-sectional view of the variable trimmer capacitor showing its assembled relationship within its housing for providing variable impedance characteristics.

As shown in FIGS. 1 and 3, the housing 102 is rectangular in nature having a configured hollow interior generally designated by reference numeral 116. The hollow interior 116 is configured to receive the base 104, rotor 106, worm gear 108, stator terminal 110, rotor terminal 112 and dielectric plates 114 as shown in FIG. 4. Similarly, the base 104 is provided with a hollow interior generally designated by reference numeral 118 configured to receive the aforementioned components.

As shown in FIG. 3, the housing 102 is provided with a partial disk-shaped opening 120 arranged adjacent a bore 122 having an enlarged annular recess 124. Both the disk-shaped opening 120 and bore 122 communicate at their lower end with a rectangular opening 126 which is dimensioned to receive the base 104. In turn, as shown ing FIG. 1, the base 104 is provided with a partial disk-shaped opening 128 arranged adjacent a bore 130. Overlying either side of a portion of the disk-shaped opening 128 are a pair of dielectric plate receiving openings 132.

When the base 104 is inserted into the rectangular opening 126 of the housing 102, bore 122 communicates with bore 130 to receive worm gear 108 as shown in FIG. 4. Similarly, partial disk-shape opening 120 communicates with partial disk-shape opening 128 to receive rotor 106. The dielectric plates 114 are received within the dielectric plate receiving openings 132 and overly portions of the rotor 106 as to be described hereinafter. Recess end wall surfaces 134 of the base 104 cooperate with interior wall surfaces 136 of the housing 102 to provide a channel 138 adapted to receive a portion of the stator terminal 110 and rotor terminal 112. For the purpose to be described hereinafter, the central axis 140 of bore 122 is slightly off center from the central axis 142 of bore 130.

The housing 102 and base 104 may be constructed from suitable plastic materials such as polyphenylene sulfide resins and polyetherimide resins. Additionally, it is contemplated that a variety of ceramics, for example, alumina, that can be formed or molded may be employed.

As shown in FIG. 1, the rotor 106 is constructed of a disk-shaped cylindrical member 144 having a pair of parallel spaced apart planar surfaces 146. Extending within each surface 146 are oppositely aligned D-shaped openings 148 which define a ring shaped peripheral surface portion 150, as further illustrated by the dotted lines. A plurality of gear teeth 152 arranged extending radially outward about the circumferential side of the cylindrical member 144. The rotor 106 is preferably constructed of metallic material, for example, copper based alloys, brass- beryllium-copper, phosphor bronze or zinc plated metal. As it is only required that the surfaces 144 be electrically conductive, the surfaces may comprise a metal deposited layer on a cylindrical member 144 constructed of plastic material.

Figure 2:
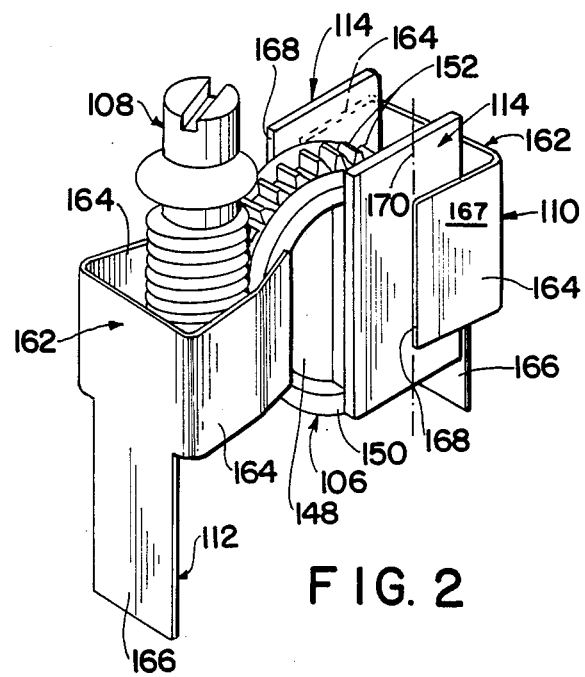
FIG. 2 is a perspective view of the variable trimmer capacitor showing its assembled relationship without its housing for providing variable impedance characteristics.

The worm gear 108, as shown in FIGS. 1, 2 and 4, is constructed of a cylindrical body 154 circumferentially surrounded about its major lower portion by a plurality of threads 156. The opposing end of the cylindrical body 154 is provided with a transverse slot 158 adapted to receive the tip of a screw driver or other such implement to effect rotation of the worm gear 108 as to be described hereinafter. A sealing ring 160 is arranged circumferentially about the cylindrical body 154 between slot 158 and threads 156. The sealing ring 160 may be integrally formed from the same material as the cylindrical body 154 or as a separate 0-ring from suitable elastomeric material. The worm gear 108 may be constructed from a variety of materials, such as stainless steel, plastic or the like.

The stator terminal 110 and rotor terminal 112 are similarly constructed from a U-shaped member 162 having a pair of legs 164 defining contacts and a depending member 166 defining external contact terminals. The stator terminal 110 and rotor terminal 112 may be constructed from a variety of metals, such as copper based alloys, brass-beryllium-copper, phosphor bronze or base metals plated with silver or gold.

The dielectric plates 114 are generally of rectangular construction adapted to be received within the dielectric plate receiving openings 132 so as to overly a portion of surfaces 146 of the rotor 106. The dielectric plates 114 can be constructed of a variety of materials, for example, quartz, alumina (aluminum oxide), sapphire (aluminum oxide pure crystal), porcelain, dielectric resonator materials, barium titanate ceramics, plastics and the like. The outer surface of the dielectric plates 114 are coated with a conductive layer 167, e.g., a metallized layer such as a silver frit, platinum, copper and the like. In addition, the outer layer of the dielectric plates 114 may be in the nature of a metal plated base alloyed using thick or thin film technology.

The assembly of the aforementioned components will now be described with reference to FIGS. 2 and 4. In the assembled relationship, the rotor 106 is rotatably received within the cooperating disk-shaped openings 120,128 as shown in Figs. and 3. A dielectric plate 114 is positioned overlying a portion of the opposing surfaces 146 of the rotor 106. The dielectric plates 114 are maintained in proper registration by being received within the dielectric plate receiving openings 132 of the base 104 and a similar portion of the housing 102. In this regard, although the dielectric plates 114 are maintained in position, they are considered to be free floating. That is, the dielectric plates 114 are allowed to move inwardly towards each other within the housing 102 so as to make surface contact with opposing surfaces 146 of the rotor 106.

To this end, stator terminal 110 has its depending member 166 extending through channel 138 and the depending legs 164 of the U-shaped member 162 extending about and engaging the spaced apart dielectric plates 114. The dimension between the free end of legs 164 is smaller than the distance between the outer surfaces of the dielectric plates 114. As a result, the U-shaped member 162 of the stator terminal 110 compresses each dielectric plate 114 into surface contact with the surface 146 of the rotor 106. Any air gap between the dielectric plates 114 and the surface 146 of the rotor 106 is effectively eliminated which would otherwise cause potential variations in the dielectric constant of the trimmer capacitor 100 from time to time during operation.

More specifically, the leading edge 168 of legs 164 contacts the dielectric plates 114 on their outer metallized surface 167 along their longitudinal center lines 170. As such, there is an even and uniform force applied to the free floating dielectric plates 114 to insure uniform and constant surface contact between the dielectric plates and the surface 146 of the rotor 106 during rotation thereof for adjustment and subsequently during use when installed in an electronic device.

The rotor terminal 112 is similarly arranged with the leading edges 168 of legs 164 in contact with a portion of the ring shaped portion 150 defined on the surface 146 of the rotor 106. Thus, the stator terminal 110 and rotor terminal 112 have four related functions, providing contact to the rotor 106, providing compression to maintain contact with the rotor 106, providing contact with the dielectric plates 114 and providing terminals, i.e., depending members 166, to the electronic circuit in which the trimmer capacity 100 is employed.

Rotation of the rotor 106 is achieved by worm gear 108. The worm gear is positioned within cooperating bores 122,130 provided within the housing 102 and base 104. The worm gear 108 is confined between the legs 164 of the U-shaped member 162 of the rotor terminal 112. The plurality of threads 156 mesh with the gear teeth 152 on the rotor 106. Accordingly, upon rotation of the worm gear 108 by an implement engaging slot 158, the rotor 106 will rotate about its center axis. As previously described, central axis 142 of bore 130 is inwardly off center from the central axis 140 of bore 122. This arrangement tilts the worm gear 108 inwardly towards the rotor 106 to insure positive meshing of threads 156 with gear teeth 152.

As the printed circuit board to which the trimmer capacitor 100 is mounted will inevitably be subjected to process cleaning fluids and the like, it is highly desirable that the trimmer capacitor be sealed from the surrounding environment. To this end, a potting compound 172 is provided overlying the exposed surface of the base 104 and around the depending members 166 of the stator terminal 110 and rotor terminal 112. The only remaining opening, bore 122 within the housing 102 is sealed internally by means of sealing ring 160. As shown in FIG. 4, the sealing ring 160 is frictionally received within the annular recess 124 formed within the housing 102 to provide a fluid tight seal thereat. An alternative manner of forming the annular recess 124 would be to provide a counterbore (not shown) along the longitudinal axis of bore 122. The sealing ring 160 would be positioned at the bottom of the counterbore and held in place by a short sleeve (not shown) whose inside diameter would be slightly less than that of the bore 122.

Briefly, in operation, the tip of a screw driver or other such implement is inserted within slot 158 to rotate the worm gear 154 about its longitudinal axis. As a result, rotor 106 is rotated about is central axis to orient the D-shaped openings 148 between their extreme positions shown in FIGS. 2 and 4. As shown in FIG. 2, the inwardly facing surfaces of the dielectric plates 114 are in maximum surface contact with surface 146 of rotor 106. As a result, the trimmer capacitor 100 has its maximum rated capacitance. On the other hand, when the rotor is arranged in the position shown in FIG. 4, the inwardly facing surfaces of the dielectric plates 114 have minimum surface contact with surfaces 146 of the rotor. This is a result of the presence of the D-shaped openings 148 being arranged underlying the dielectric plates 114. In this event, the trimmer capacitor 100 has its minimum rated capacitance.

As the worm gear 108 is rotated, the capacitance will vary from its minimum to maximum depending upon the percentage of surface contact between the pair of dielectric plates 114 and the surfaces 146 on either side of the rotor 106. In this regard, the leading edges 168 of legs 164 of the stator terminal 110 applies a uniform force along center line 170 to maintain intimate surface contact between the surface of the dielectric plates 114 and the surface 146 of the rotor 106 during rotation and subsequently during use. By determining the number of gear teeth 152 on the rotor 106 and threads 156 on the worm gear 108, the resolution of the trimmer capacitor 100 may be predetermined. For example, a high resolution trimmer capacitor 100 requiring 30 to 40 revolutions of the worm gear 108 to effect one revolution of the rotor 106 is contemplated in accordance with one embodiment of the present invention.

Although the invention herein has been described with reference to particular embodiments, it is to be understood that these embodiments are merely illustrative of the principles and application of the present invention. It is therefore to be understood that numerous modifications may be made to the embodiments and that other arrangements may be devised without departing from the spirit and scope of the present invention as defined by the dependent claims.

We claim:

1. A variable electronic component comprising a housing, a rotor within said housing, said rotor having a contact portion and an impedance varying portion, rotating means for rotating said rotor, an impedance varying member arranged overlying a portion of said impedance varying portion, first contact means engaging said contact portion of said rotor without engaging said impedance varying member, and second contact means urging said impedance varying member into sliding contact with a portion of said impedance varying portion, whereby rotation of said rotor varies the extent of overlap between said impedance varying member and said impedance varying portion to provide a desired range of impedance characteristics to said component.

2. The variable electronic component according to claim 1, wherein said housing is sealed to the surrounding environment and is constructed to have an internal configuration receiving said rotor, said rotating means, said impedance varying member, said first contact means and said second contact means in operative relationship.

3. The variable electronic component according to claim 1, wherein said rotating means comprises a cylindrical body having a portion thereof circumferentially surrounded by a plurality of threads.

4. The variable electronic component according to claim 3, wherein said cylindrical body includes means at one end thereof extending outside of said housing for engagement therewith to effect rotation of said body within said housing.

5. The variable electronic component according to claim 3, wherein said rotor includes a plurality of gear teeth extending radially outward about said rotor in meshed engagement with said threads of said rotating means.

6. The variable electronic component according to claim 5, wherein said cylindrical body is arranged along an axis tilted towards said rotor to maintain engagement of said threads with said gear teeth during rotation of said rotor by said rotating means.

7. The variable electronic component according to claim 1 wherein said rotating means includes sealing means engageable with a portion of said housing for providing a seal thereat.

8. The variable electronic component according to claim 1 wherein said rotor comprises a cylindrical member having an end surface, said contact portion of said rotor comprising a peripheral portion of said end surface.

9. The variable electronic component according to claim 8, wherein said impedance varying portion comprises a region of said end surface confined by said peripheral portion.

10. The variable electronic component according to claim 9, wherein said region comprises a substantially planar portion and an adjacent opening.

11. The variable electronic component according to claim 10, wherein said impedance varying member is arranged overlying varying extents of said planar portion and said opening during rotation of said rotor to provide a range of impedance characteristics to said component.

12. The variable electronic component according to claim 8, wherein said contact portion and said impedance varying portion are provided on opposite ends of said cylindrical member.

13. The variable electronic component according to claim 12, wherein said first contact means includes a pair of legs for engaging the contact portions arranged on opposite ends of said cylindrical member.

14. The variable electronic component according to claim 12, wherein said impedance varying portion is provided on opposite ends of said cylindrical member.

15. The variable electronic component according to claim 14, wherein said second contact means comprises a U-shaped member having a pair of legs compressing the impedance varying members respectively against the impedance varying portions on opposite ends of said cylindrical member.

16. The variable electronic component according to claim 1, wherein said second contact means engages said impedance varying member along its longitudinal center axis.

17. A variable electronic component comprising a housing, a rotor comprising a cylindrical member having a peripheral region arranged within said housing, said rotor having a contact portion and an impedance varying portion, rotating means engaging said peripheral region of said rotor for rotating said rotor within said housing, an impedance varying member arranged overlying a portion of said impedance varying portion, first contact means coupled to said contact portion, and second contact means urging said impedance varying member into sliding contact with a portion of said impedance varying portion, whereby rotation of said rotor varies the extent of overlap between said impedance varying member and said impedance varying portion to provide a desired range of impedance characteristics to said component.

18. The variable electronic component according to claim 17, wherein said rotating means comprises a cylindrical body having a portion thereof circumferentially surrounded by a plurality of threads.

19. The variable electronic component according to claim 18, wherein said rotor includes a plurality of gear teeth extending radially outward about said rotor in meshed engagement with said threads of said rotating means.

20. The variable electronic component according to claim 19, wherein said cylindrical body is arranged along an axis tilted towards said rotor to maintain engagement of said threads with said gear teeth during rotation of said rotor by said rotating means.

21. The variable electronic component according to claim 20, wherein said impedance varying member is arranged overlying varying extents of said planar portion and said opening during rotation of said rotor to provide a range of impedance characteristics to said component.

22. The variable electronic component according to claim 17, wherein said rotor has an end surface, said contact portion of said rotor comprising a peripheral portion of said end surface.

23. The variable electronic component according to claim 22, said impedance varying portion comprises a region of said end surface confined by said peripheral portion, said region comprising a substantially planar portion and an adjacent opening.

24. The variable electronic component according to claim 22, wherein said contact portion and said impedance varying portion are provided on opposite ends of said cylindrical member.

25. The variable electronic component according to claim 24, wherein said first contact means includes a pair of legs for engaging the contact portions arranged on opposite ends of said cylindrical member.

26. The variable electronic component according to claim 24, wherein said impedance varying portion is provided on opposite ends of said cylindrical member, and said second contact means comprising a U-shaped member having a pair of legs compressing the impedance varying members respectively against the impedance varying portions on opposite ends of said cylindrical member.

27. The variable electronic component according to claim 17, wherein said second contact means engages said impedance varying member along its longitudinal center axis.

28. The variable electronic component according to claim 17, wherein said housing is sealed to the surrounding environment and is constructed to have an internal configuration receiving said rotor, said rotating means, said impedance varying member, said first contact means and said second contact means in operative relationship.

* * * * *